United States Patent [19]
Hirata et al.

[11] Patent Number: 5,640,057
[45] Date of Patent: Jun. 17, 1997

[54] VEHICULAR ANTI-THEFT SYSTEM INCLUDING A SECURITY CONTROL UNIT AND AN ENGINE CONTROL UNIT THAT USES A RESET AND MEMORY

[75] Inventors: Sanae Hirata; Takahiro Hayakawa, both of Okazaki, Japan

[73] Assignee: Nippondenso Co., Ltd., Kariya, Japan

[21] Appl. No.: 527,189

[22] Filed: Sep. 12, 1995

[30] Foreign Application Priority Data

Sep. 26, 1994 [JP] Japan .................................. 6-229372
Jun. 19, 1995 [JP] Japan .................................. 7-151642

[51] Int. Cl.$^6$ ............................................ B60R 25/04
[52] U.S. Cl. .............................. 307/10.3; 180/287
[58] Field of Search ................................ 307/9.1–10.6; 180/287; 340/425.5, 426, 441, 825.3–825.32, 825.34, 825.69, 825.72; 364/424.01, 424.05; 123/198 DB, 198 DC, 198 B, 146.5 B, 179.3, 179.4

[56] References Cited

U.S. PATENT DOCUMENTS

| 4,749,873 | 6/1988 | Mutoh et al. ................ 307/10.2 |
| 4,965,460 | 10/1990 | Tanaka et al. .............. 307/10.2 |
| 4,990,906 | 2/1991 | Kell et al. ................. 340/825.31 |
| 5,160,914 | 11/1992 | Sato ............................ 340/426 |
| 5,519,376 | 5/1996 | Iijima ......................... 340/426 |

FOREIGN PATENT DOCUMENTS

| 332962 | 2/1991 | Japan . |
| 4297354 | 10/1992 | Japan . |
| 6156191 | 6/1994 | Japan . |
| 769175 | 3/1995 | Japan . |
| 6129098 | 4/1995 | Japan .................. 307/10.5 |
| 6134431 | 4/1995 | Japan .................. 307/10.5 |
| 6299026 | 7/1995 | Japan .................. 307/10.5 |

*Primary Examiner*—Richard T. Elms
*Attorney, Agent, or Firm*—Cushman, Darby & Cushman IP Group of Pillsbury Madison & Sutro LLP

[57] ABSTRACT

An anti-theft system is arranged so that an operation of an engine of a vehicle is maintained as it is even when a CPU of an engine control unit is reset for some reason during when the engine is operative. A CPU of a security ECU performs arithmetic operations for enabling or inhibiting injection of fuel to the engine and for enabling to start a starter on condition that a door key switch and an ignition switch are both turned on. The CPU of the engine ECU performs arithmetic operations to maintain the injection of fuel to the engine based on data of fuel injection enabling or inhibiting process stored in a B/U RAM even when it is reset after receiving the data of process for enabling or inhibiting the injection of fuel from the CPU.

17 Claims, 12 Drawing Sheets

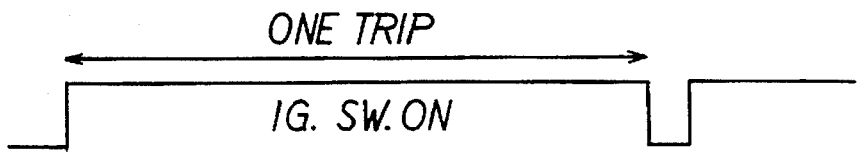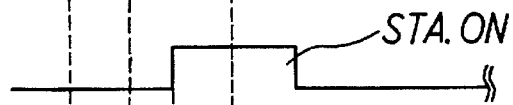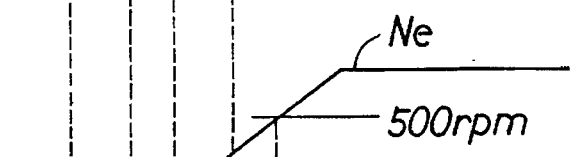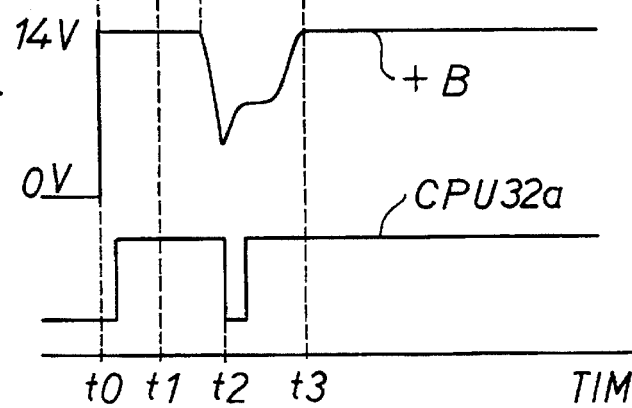

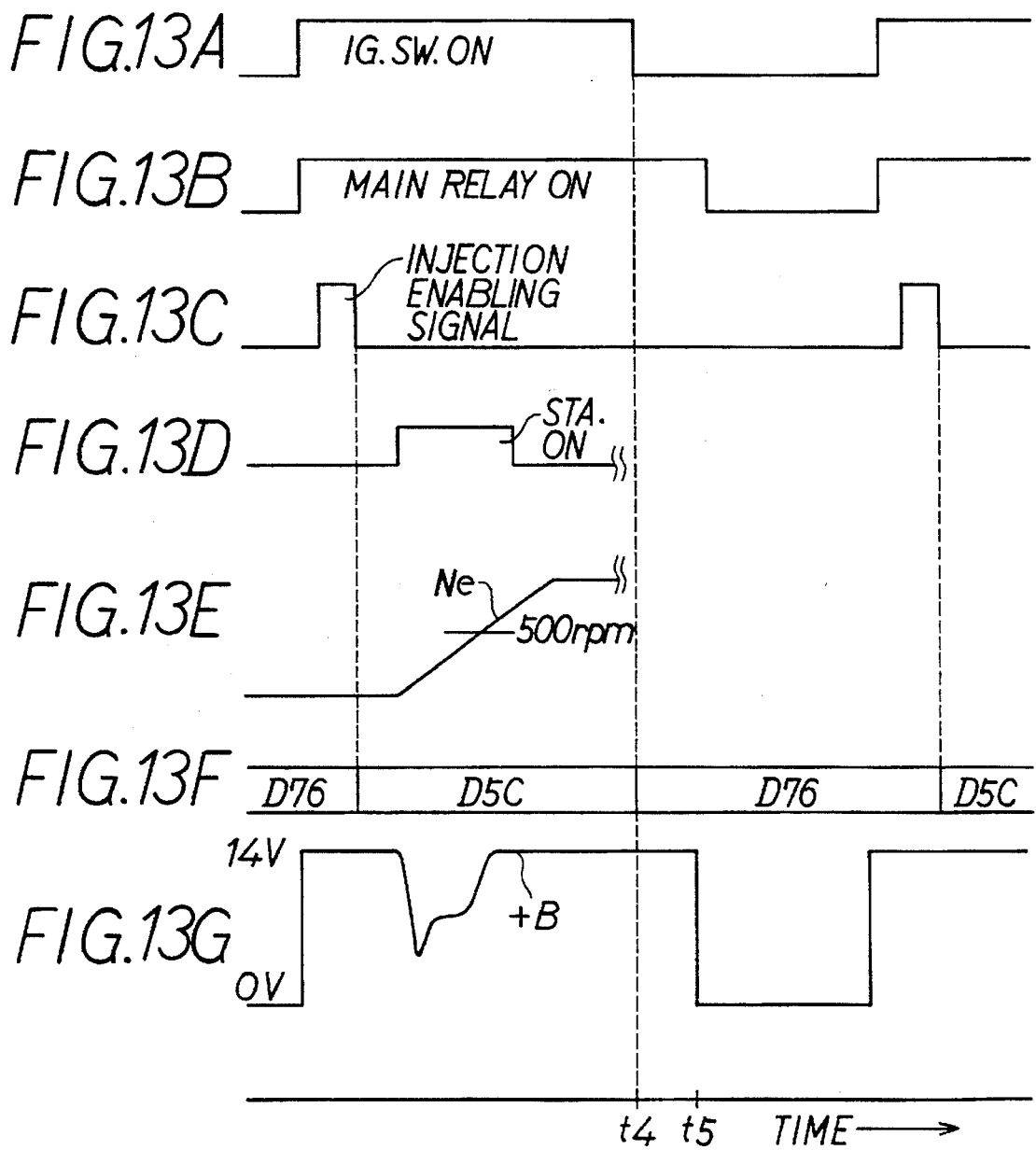

VEHICULAR ANTI-THEFT SYSTEM INCLUDING A SECURITY CONTROL UNIT AND AN ENGINE CONTROL UNIT THAT USES A RESET AND MEMORY

CROSS REFERENCE TO RELATED APPLICATION

This application is based on and claims priorities of Japanese Patent Applications No. 6-229372 filed Sep. 26, 1994 and No. 7-151642 filed Jun. 19, 1995, the contents of which are incorporated herein by reference.

BACKGROUND OF THE INVENTION

1. Field of the Invention

The present invention relates to an anti-theft system adopted for vehicles such as automobiles, motorcycles, boats and the like.

2. Description of Related Art

Hitherto, as a vehicular anti-theft system, there is one, as disclosed in Japanese Patent Laid-Open No. 64-56248 (U.S. Pat. No. 4,965,460) for example, which keeps an engine which has once started running even if a supply of power voltage to an engine electronic control unit (hereinafter referred to as engine ECU) is unintentionally cut off, as long as a mechanical key is at a position of turning on an ignition switch, by maintaining the engine ECU on the ON state continuously by a security electronic control unit (hereinafter referred to as security ECU) by its holding circuit.

However, because the anti-theft system disclosed in Japanese Patent Laid-Open No. 64-56248 has the following problem as it is arranged so that after when the ignition switch is turned on, the security ECU sends an injection enabling signal for enabling to inject fuel to the engine to the engine ECU only once and the engine ECU shifts to a control of the injection of fuel after checking the transmission of the injection enabling signal from the security ECU by an initialization process along reset of its CPU.

That is, only a measure for preventing the stoppage of the engine during its operation is taken and no measure for a case when the CPU of the engine ECU is reset after the transmission of the injection enabling signal from the security ECU is taken in this system.

Accordingly, when the CPU of the engine ECU is reset when a power voltage of a car battery drops or is instantaneously cut off for example in activating a starter to start the engine, the injection enabling signal is not transmitted again as described above from the security ECU after when the power voltage has returned. Due to that, the injection of fuel is disabled. The same applies to a case when the CPU of the engine ECU is reset due to an abnormality thereof caused by an overrun of its function for example.

Further, as disclosed in Japanese Patent Laid-Open No. 3-32962, there is a vehicular anti-theft system which is arranged so that a function of an engine ignition system is stopped when a theft is detected and so that the function of ignition system is not stopped to hence keep running the engine once started when a circuit for detecting an operative state of the engine has detected the operative state of the engine.

The vehicular anti-theft system disclosed in Japanese Patent Laid-Open No. 3-32962 has a problem that the engine ignition system is also cut off in addition to the problem similar to the case described above.

SUMMARY OF THE INVENTION

Accordingly, it is an object of the present invention to solve the aforementioned problems by providing a vehicular anti-theft system which is arranged so that operation of an engine is maintained as it is even if a CPU of an engine control unit is reset for some reason during the operation of the vehicular engine.

According to a first aspect of the invention, a CPU performs arithmetic operations so as to maintain starting of an engine and operation thereafter based on information stored in storage means even if it is reset again after the transmission of a start enabling data. Accordingly, even if the CPU is reset again due to a drop or instant cut-off of a voltage supplied from a power source, the CPU can maintain, without being influenced by that, the starting of the engine and operation thereafter by utilizing the information stored in the storage means.

According to a second aspect of the invention, a CPU performs arithmetic operations so as to maintain starting of an engine, operation thereafter or inhibition of starting based on information stored in storage means even if it is reset again after transmission of a start enabling data or start inhibiting data. Accordingly, even if the CPU is reset again due to a drop or instant cut-off of a voltage supplied from a power source, the CPU can maintain, without being influence by that, the starting of the engine, the operation thereafter or the inhibition of the starting by utilizing the information stored in the storage means.

Preferably, when the start enabling information is stored in the storage means before detected number of revolutions of engine speed detecting means reaches a start completing number of revolutions of the engine, the CPU can maintain the starting of the engine based on the stored start enabling information even if it is reset again due to a drop of the voltage supplied from the power source.

Preferably, the CPU can maintain the operation of the engine based on the stored start enabling data even if it is reset again by a cut-off of a voltage supplied from the power source after when the detected number of revolutions reached the start enabling data of the engine.

Preferably, when the pre-starting start enabling data of the engine is stored in the storage means as start enabling information before the detected number of revolutions of the engine speed detecting means reaches the start completing number of revolutions, the CPU can maintain the operation of the engine even if it is reset again due to a drop of the voltage supplied from the power source, without being influenced by that, based on the start enabling information of the pre-starting start enabling data. Further, when the post-starting start enabling data of the engine is stored in the storage means as start enabling information instead of the pre-starting start enabling data after when the detected number of revolutions has reached to the start completing number of revolutions of the engine, the CPU can maintain the operation of the engine even if it is reset again by a cut-off of the voltage supplied from the power source Ba based on the start enabling information of the post-starting start enabling data.

More preferably, the pre-starting start enabling data, post-starting start enabling data and start inhibiting data are composed respectively of a value of predetermined digits and a part of at least two digits of the start inhibiting data is different from that of the pre-starting start enabling data and the post-starting start enabling data. Thereby, even if noise or the like which is generated when the engine rotates at high-speed is produced, no change which otherwise takes place among the start inhibiting data and the pre-starting start enabling data or the post-starting start enabling data that they coincide from each other will not take place. As a result, the engine will not be erroneously started or its operation will not be erroneously inhibited.

Preferably, the storage means is a non-volatile memory, and the data stored in the storage means is continuously stored as it is even when the voltage supplied from the power source is cut off.

Preferably, when the pre-starting start enabling data of the engine is stored in the storage means as start enabling information before the detected number of revolutions of the engine speed detecting means reaches the start completing number of revolutions, the CPU can maintain the operation of the engine even if it is reset again due to a drop of the voltage supplied from the power source, without being influenced by that, based on the start enabling information of the pre-starting start enabling data. Further, because the storage means stores the post-starting start enabling data of the engine as start enabling information instead of the pre-starting start enabling data when the detected number of revolutions has reached to the start completing number of revolutions of the engine, the CPU can maintain the operation of the engine even if it is reset again as the voltage supplied from the power source is cut off based on the start enabling information of the post-starting start enabling data.

According to a third aspect of the invention, a CPU performs arithmetic operations so as to maintain starting of an engine or the operation thereafter even if it is reset again after transmission of a start enabling data based on an information stored in storage means. Further, other information is stored instead of the start enabling information during when relay means supplies a voltage of a power source to the CPU for a predetermined period of time after a starting switch is released. Because the information stored in the storage means is rewritten when the starting switch is released, a third party who tries to start the engine illegitimately cannot start the engine thereafter. As a result, the engine can be inhibited from being illegitimately started.

BRIEF DESCRIPTION OF THE DRAWINGS

In the accompanying drawings:

FIGS. 8A to 8G are time charts showing operations of the first embodiment shown in FIG. 1;

FIGS. 13A to 13G are time charts showing operations of the second embodiment shown in FIG. 9.

DETAILED DESCRIPTION OF PREFERRED EMBODIMENTS

The present invention will be described in detail with reference to presently preferred embodiments shown in the accompanying drawings.

[First Embodiment]

A first preferred embodiment of the present invention will be explained below with reference to FIGS. 1 through 8G.

Figure 1:
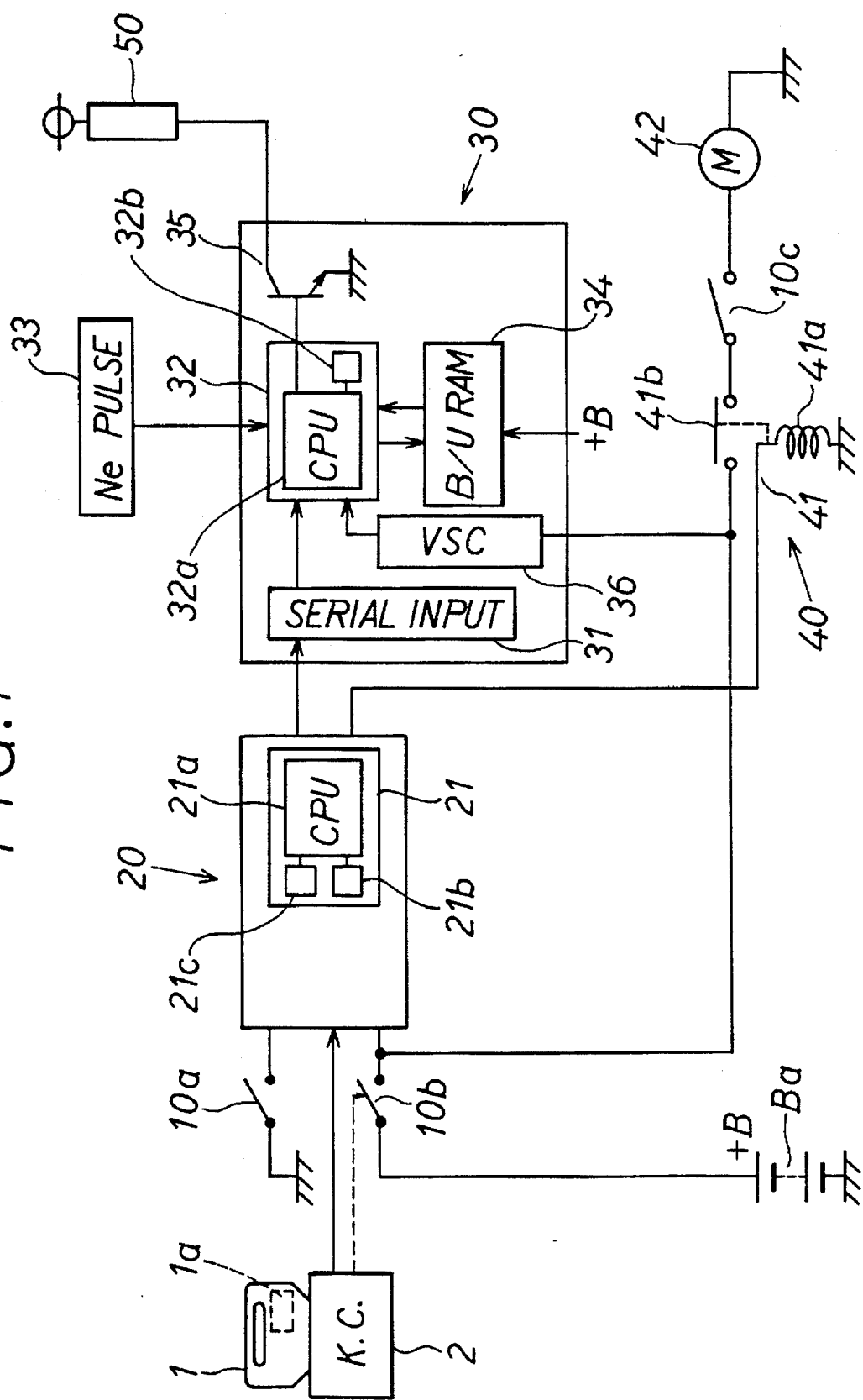
FIG. 1 is a schematic structural view of a whole circuit showing a first embodiment of the present invention.

FIG. 1 schematically shows a structure of a whole circuit of a vehicular anti-theft system to which the present invention is applied.

In FIG. 1, an ignition key 1 is equipped with a memory 1a for storing a predetermined password code and an ignition key cylinder 2 is equipped with a reader (not shown) for reading this password code.

The anti-theft system includes a security ECU 20 which is connected to a door key switch 10a, an ignition switch 10b and the ignition key cylinder 2 of a vehicle. The door key switch 10a is turned on when a lock of the door of the vehicle is released by inserting a door key to a door key cylinder lock and by turning it.

When the ignition key 1 is inserted to the ignition key cylinder 2 and is turned, the ignition switch 10b turns on, supplying a power voltage (hereinafter referred to as +B voltage) from a car battery Ba to the security ECU 20, an engine ECU 30 and a starter 40 described later.

The security ECU 20 is equipped with a microcomputer 21 comprising a CPU 21a, a timer 21b, a ROM 21c, a RAM (not shown), and the like.

A password code is stored in the ROM 21c and the CPU 21a collates the password code within the key read by the ignition key cylinder 2 with the password code within the ROM 21c to determine whether the key inserted to the ignition key cylinder 2 is a legitimate or a valid key or not.

The CPU 21a is set by +B voltage supplied from the battery Ba via the ignition switch 10b and executes a security program in accordance with a flowchart shown in FIG. 2 described later. During the execution, an arithmetic processing for enabling or inhibiting injection of fuel to the engine and an arithmetic processing for enabling an activation of the starter 40 are performed on condition that the both the door key switch 10a and the ignition switch 10b are turned on. The timer 21b starts to time at the same time when the CPU 21a is reset. The above-mentioned security program is stored in the ROM 21c of the microcomputer 21 in advance, while the RAM stores various data.

The engine ECU 30 has a serial input circuit 31 which receives signals transmitted from the CPU 21a of the security ECU 20 and outputs them to a microcomputer 32.

The microcomputer 32 comprises a CPU 32a, a timer 32b, a ROM (not shown), a RAM (not shown) and the like. The CPU 32a is reset when it receives a constant-voltage of 5 V from a voltage stabilizing circuit (VSC) 36 and executes an engine control program in accordance with flowcharts shown in FIGS. 3 through 5 described later as well as an interrupt control program in accordance with a flowchart shown in FIG. 6 described later.

During the execution of the engine control program, a number of revolutions or rotation speed Ne of the engine is calculated on the basis of pulse signals sequentially generated from a pulse sensor 33 per 30° of angle of revolution of the engine. Further, a process for writing/reading data to/from a backup RAM 34 (hereinafter referred to as a B/U RAM 34), a process for rewriting data and a process for enabling or inhibiting injection of fuel are carried out.

Meanwhile, during the execution of the interrupt control program, a process for starting injection of fuel is selectively carried out. The timer 32b starts to time at the same time when the CPU 32a is reset. It is to be noted that the voltage stabilizing circuit 36 generates the above-mentioned constant-voltage by receiving +B voltage from the battery Ba via the ignition switch 10b.

The B/U RAM 34 always receives +B voltage from the battery Ba to be put into a writable/readable state. Data from the CPU 32a is written into the B/U RAM 34 and is held as it is even when +B voltage from the battery Ba is cut off. A driving transistor 35 is turned on based on injection data from the CPU 32a and drives a fuel injector 50. By being driven by the transistor 35, the fuel injector 50 injects a predetermined amount of fuel to the engine.

The starter 40 has a magnet switch 41. The magnet switch 41 is driven by a coil 41a thereof by receiving a starter enabling signal from the CPU 21a of the security ECU 20 and turns on a normally opened switch 41b. A starter motor 42 turns by receiving +B voltage from the battery Ba via the switch 41b and a starter switch 10c and keeps the engine in a cranking state. The starter switch 10c turns on when the ignition key 1 is turned within the ignition key cylinder 2 when the ignition switch 10b is ON.

Operations of the first embodiment constructed as described above will be explained below.

It is assumed that +B voltage is supplied from the battery Ba to the security ECU 20, the engine ECU 30 and the starter 40 (see time t0 in FIGS. 8A to 8G showing time charts representing operations of the main components shown in FIG. 1).

Figure 2:
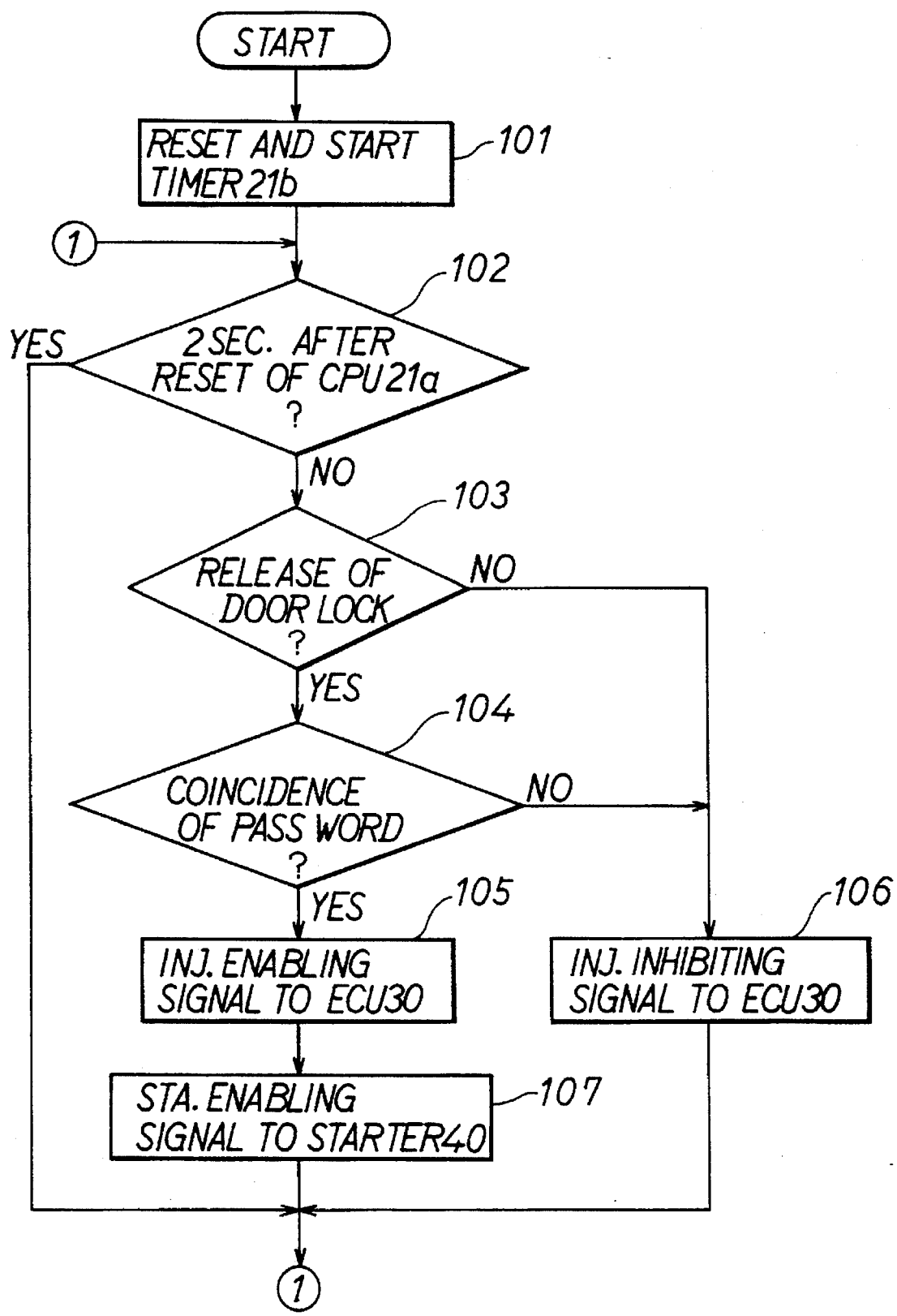
FIG. 2 is a flowchart of a security program executed by a CPU of a security ECU in FIG. 1.

Then, the CPU 21a is reset by +B voltage in the security ECU 20 and starts to execute the security program in accordance with the flowchart shown in FIG. 2. At the same time, the CPU 32a is reset by +B voltage in the engine ECU 30 and executes the engine control program in accordance with each flowchart shown in FIGS. 3 through 5. An interrupt process of the interrupt control program made by the CPU 21a is carried out per generation of the pulse signal from the pulse sensor 33 in accordance with the flowchart shown in FIG. 6.

Hereinbelow, each processing mode of the security ECU 20 and the engine ECU 30 will be explained separately.

[1] Processing Mode by Security ECU 20

The security program is executed by the CPU 21a based on the flowchart in FIG. 2, as follows.

At first, the timer 21b is reset and started at Step 101. Thereby, the timer 21b starts to time. Until when a timer value of the timer 21b reaches two seconds after the reset of the CPU 21a, the following processing is carried out.

In Step 102, it is determined to be NO based on the timer value of the timer 21b. Because the door lock of the vehicle has been released by the door key of the owner of the vehicle, it is determined to be YES in Step 103 if the door key switch 10a has been turned on. Then, the password code within the ignition key 1 is collated with the password code within the ROM 21c as described before and it is determined to be YES in Step 104 if the both password codes coincide. Thus, it is determined that the door key switch 10a and the ignition switch 10b are both normally turned on.

After that, an injection enabling signal signaling that the fuel injector 50 is permitted to inject fuel to the engine is transmitted within two seconds from the CPU 21a to the engine ECU 30 in Step 105 (see times t0 to t1 in FIG. 8B). Then, a starter activation enabling signal signaling that the starter 40 is permitted to be activated is transmitted from the CPU 21a to the starter 40 in Step 107. This starter activation enabling signal is continuously transmitted thereafter until when the ignition switch 10b is turned off. Thereby, the coil 41a of the magnet switch 41 is continuously driven, holding the switch 41b in the ON state. As a result, the anti-theft system is put into an injection enabling mode by the security ECU 20.

Meanwhile, when the door lock is forcibly released somehow, not by the valid door key of the owner of the vehicle, or when a state equal to that the ignition switch 10b is ON is being realized by forcibly short-circuiting each wire connected to both terminals of the ignition switch 10b for example, it is determined to be NO in Step 103 or 104 since the password code is not confirmed to coincide.

In such case, determining that the door lock of the vehicle is not normally released or +B voltage is not normally supplied to the security ECU 20, an injection inhibiting signal signaling that the fuel injector 50 is inhibited from injecting fuel to the engine is transmitted within two seconds in Step 106 from an aspect of preventing a theft of the vehicle. Thereby, the anti-theft system is put into an injection inhibiting mode by the security ECU 20. After when the timer value of the timer 21b reaches two seconds, it is determined to be YES in Step 102 and the security program returns to Step 102. This means that the transmission of the injection enabling signal or the injection inhibiting signal from the security ECU 20 is limited within the time until when the timer value of the timer 21b reaches two seconds.

[2] Processing Mode by Engine ECU 30 in Injection Enabling Mode

1) Processing mode until when timer value of timer 32b reaches two seconds

Figure 3:
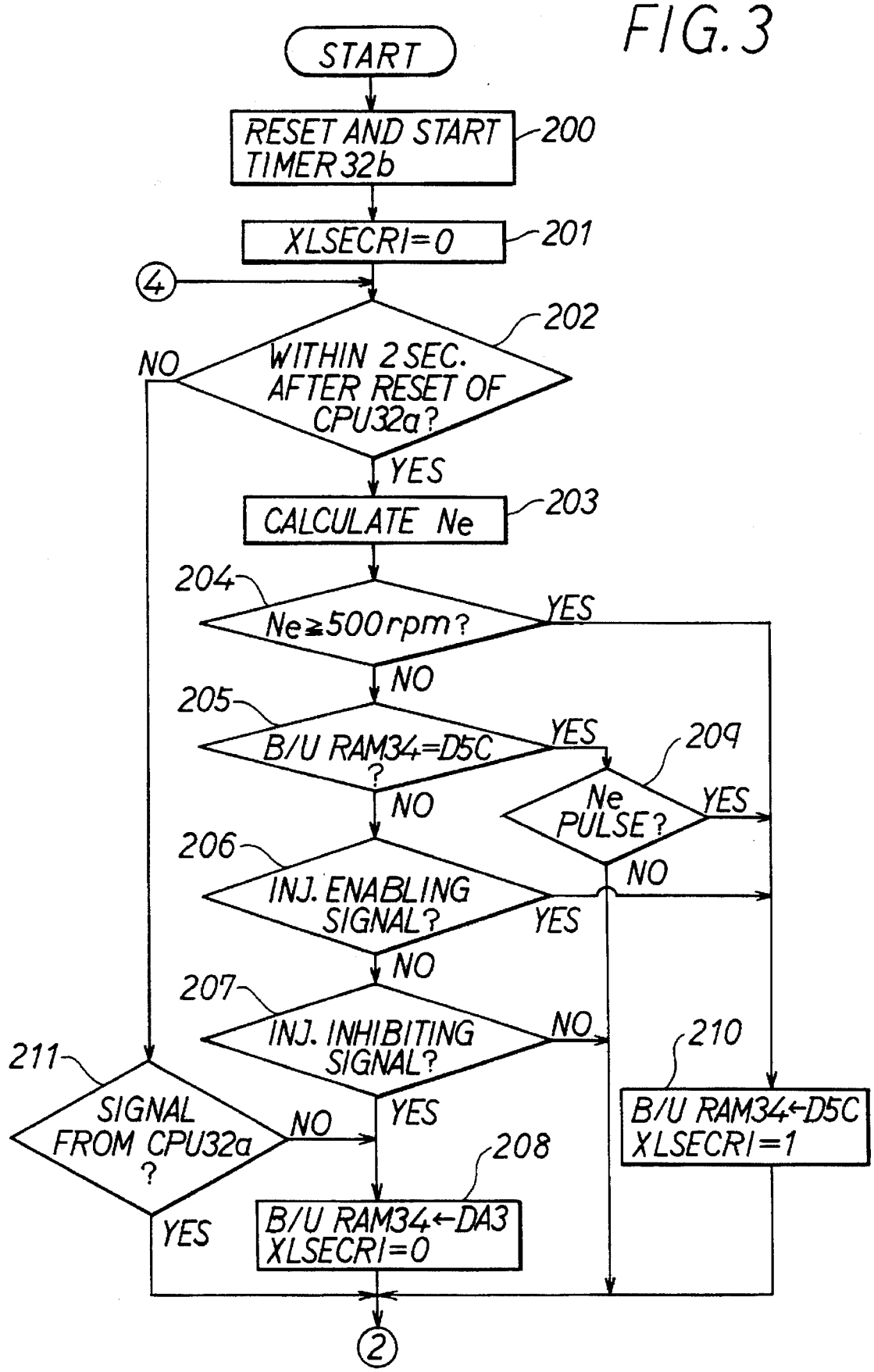
FIG. 3 shows a part of a flowchart of an engine control program executed by a CPU of an engine ECU in FIG. 1.

When the CPU 32a is reset as described above, the timer 32b is reset and starts to time in Step 200 of the flowchart in FIG. 3.

It is to be noted that the flowchart in FIG. 3 is repeatedly executed after the reset of the CPU 32a (after the reset (power-on reset) as the ignition switch 10b is turned on in starting the engine or after the reset made by a watch dog timer when an overrun of the CPU 32a is detected). However, both Steps 200 and 201 represent an initialization process executed only after the above-mentioned reset.

Because the injection enabling signal is transmitted from the security ECU 20 within two seconds after the reset of the CPU 21a as described above, a process for determining the injection-enabling signal transmitted from the security ECU 20 is performed and other processes are carried out in conjunction with that as follows until when the timer value of the timer 32b reaches two seconds after the reset of the CPU 32a.

At first, an injection enabling flag described later is reset as XLSECRI=0 in Step 201. Next, it is determined to be YES in Step 202 because the timer value of the timer 32b is within two seconds. Then, a number of revolutions Ne of the engine is calculated based on the pulse signals from the pulse sensor 33 in Step 203.

Next, it is determined whether the number of revolutions or rotational speed Ne is more than 500 rpm or not in Step 204. 500 rpm is a number of revolutions which is lower than an idle number of revolutions of the engine and by which starting is completed without stopping the engine when the number of revolutions Ne increases up to 500 rpm through the activation of the starter 40.

If the starter switch 10c is not turned on yet at the present stage, the number of revolutions Ne is zero. Due to that, it is determined to be NO in Step 204 and it is determined in Step 205 whether data D5C (hereinafter referred to as pre-starting injection enabling data D5C) indicating that fuel may be injected to the engine prior to its start is written in the B/U RAM 34 or not. The pre-starting injection enabling data D5C shows one byte of predetermined value (01011100) as shown in FIG. 7.

Figure 7:
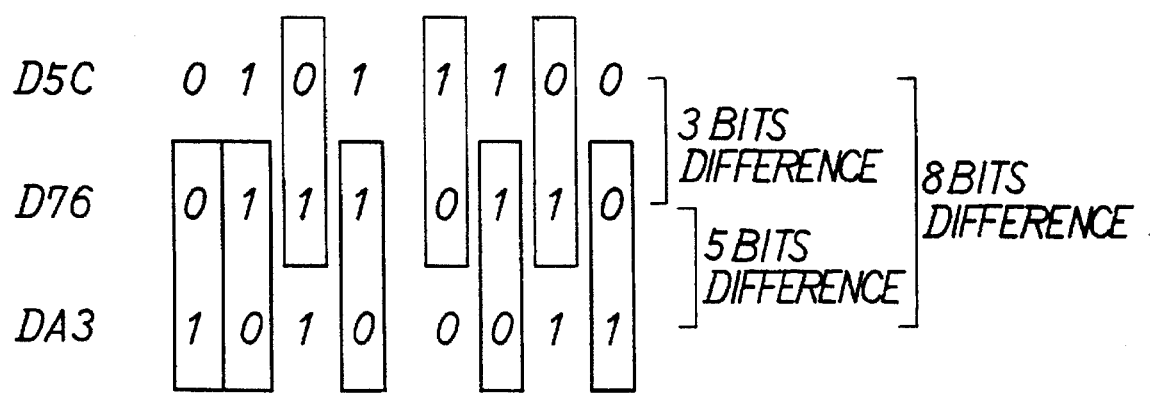
FIG. 7 is a table showing contents of injection enabling data before starting, injection enabling data after starting and injection inhibit data.
Figure 9:
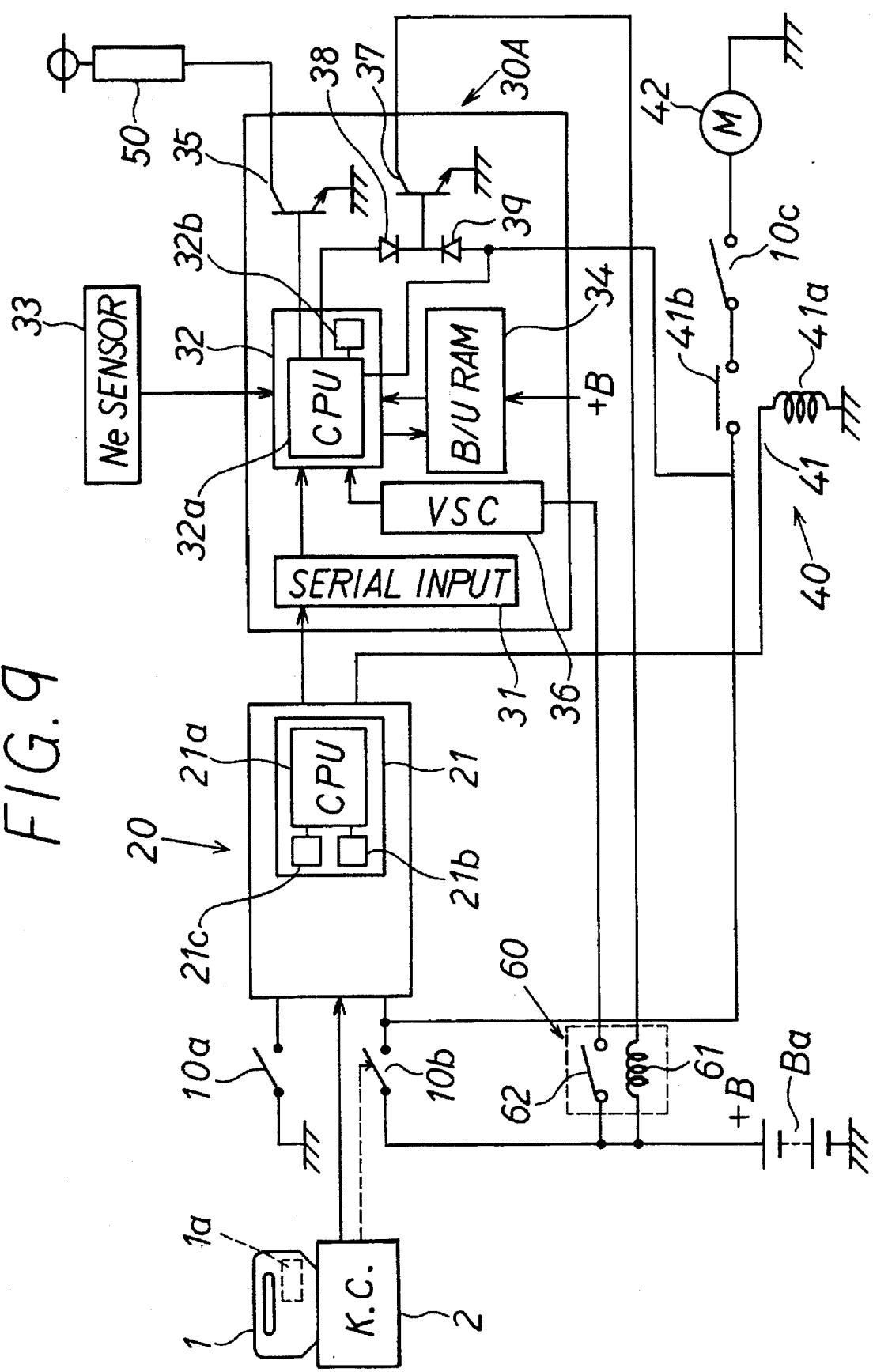
FIG. 9 is a schematic structural view of a whole circuit showing a second embodiment of the present invention.

It is to be noted that FIG. 7 shows contents of data D76 (hereinafter referred to as post-starting injection enabling data D76) enabling to inject fuel to the engine after its start and data DA3 (hereinafter referred to as injection inhibiting data DA3) indicating that the injection of fuel to the data is inhibited.

Then, if the pre-starting injection enabling data D5C has not been written in the B/U RAM 34, it is determined to be NO in Step 205. If the injection enabling signal has been transmitted from the CPU 21a as described before at this time, the injection enabling signal is input to the CPU 32a via the serial input circuit 31.

Accordingly, it is determined to be YES in Step 206 determining that the injection enabling signal exists, and the pre-starting injection enabling data D5C is written into the B/U RAM 34 at the trailing edge of the injection enabling signal in Step 210 (see time t1 in FIG. 8E) and the injection enabling flag is set as XLSECRI=1 in Step 210. Thereby, the engine ECU 30 can hold the injection enabling mode given initially by the security ECU 20 even if the injection enabling signal is not transmitted from the CPU 21a any more.

Figure 4:
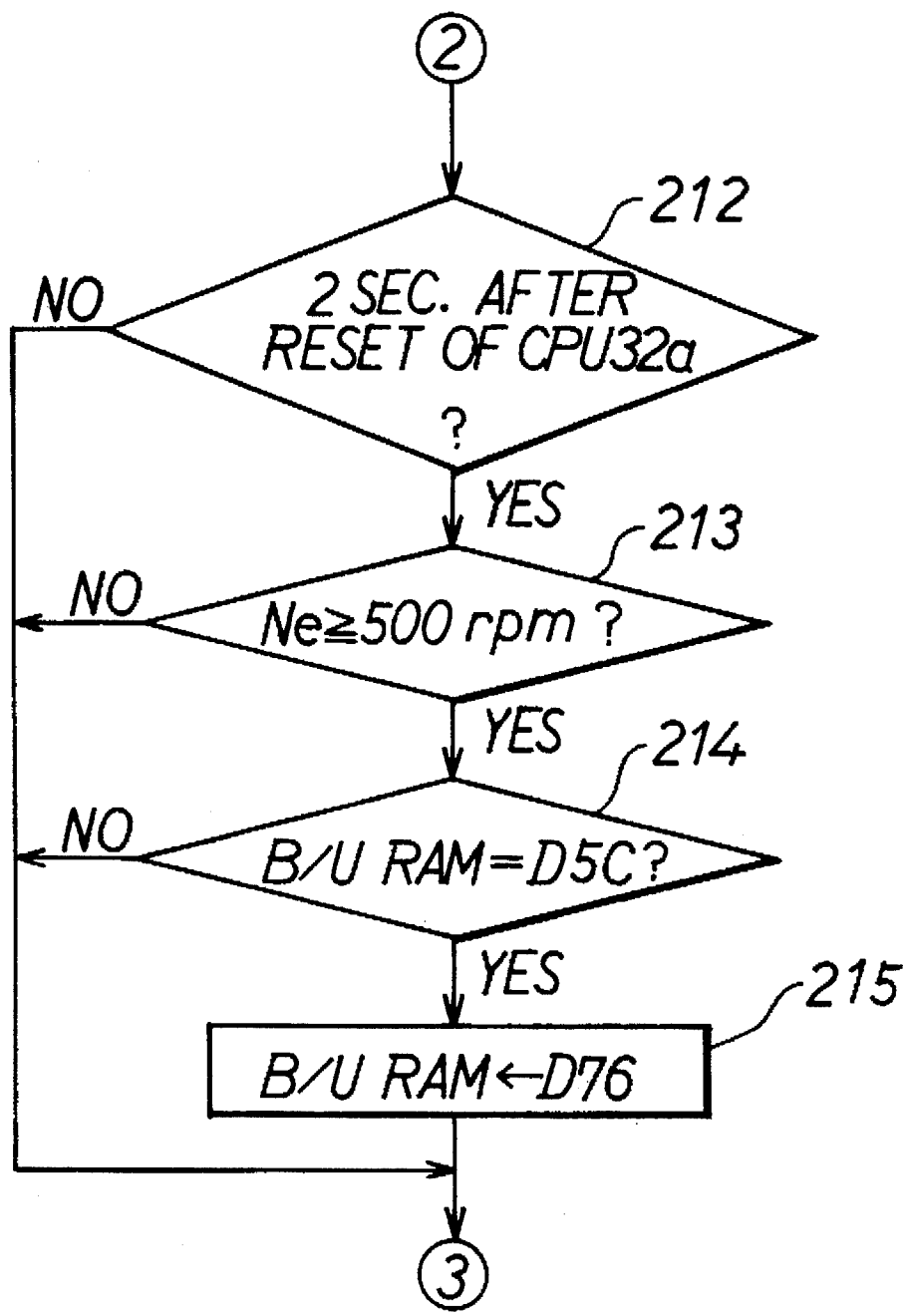
FIG. 4 shows another part of the flowchart of the engine control program executed by the CPU of the engine ECU in FIG. 1.

When the processes going through each Step of 203 through 206 and Step 210 of the flowchart in FIG. 3 are completed as described above, it is determined in Step 212 of the flowchart in FIG. 4 whether more than two seconds has passed since the reset of the CPU 32a. Because the timer value of the timer 32b has not reached two seconds at this stage, it is determined to be NO in Step 212. It is determined to be NO also in Step 216 of the flowchart in FIG. 5 for the same reason.

When the starter switch 10c is turned on at such stage, the starter motor 42 is activated by receiving +B voltage from the battery Ba via the ignition switch 10b, the switch 41b and the starter switch 10c, because the switch 41b of the magnet switch 41 is kept in the ON state, and keeps the engine in the cranking state (see time between t1 and t3 in FIG. 8C).

Meanwhile, as the engine is put into the cranking state, the pulse sensor 33 generates pulse signals sequentially. Then, the CPU 32a repeatedly executes the interrupt control program per generation of the pulse signal in accordance with the flowchart in FIG. 6.

During each of this execution, it is determined whether the injection enabling flag XLSECRI=1 or not in Step 301. Because it has been set as XLSECRI=1 (see Step 210), it is determined to be YES in Step 301 and a process for starting to inject fuel to the engine is performed in Step 302, outputting an injection starting output signal to the driving transistor 35.

Due to that, the driving transistor 35 turns on, thus driving the fuel injector 50. Thereby, the fuel injector 50 starts to inject a predetermined amount of fuel to the engine.

When the engine control program reaches again to Step 204 of the flowchart in FIG. 3 in such state, it is determined whether the number of revolutions Ne is more than 500 rpm or not. If the number of revolutions Ne has not reached 500 rpm in the engine cranking state described above, it is determined to be NO in Step 204. Then, because the pre-starting injection enabling data D5C has been already written into the B/U RAM 34 (see Step 210), it is determined to be YES in Step 205. Because the pulse signals have been already generated from the pulse sensor 33 at this stage, it is determined to be YES in Step 209 and the process in Step 210 is performed in the same manner described above.

Accordingly, although the process is executed from Step 200 again when +B voltage drops as the starter 40 is activated as described above and the CPU 32a is reset again without resetting the CPU 21a (see time t2 in FIGS. 8F and 8G), the engine ECU 30 can hold the injection enabling mode given initially by the security ECU 20 by the processes going through each Step 204, 205, 209 and 210 even the injection enabling signal is not transmitted from the CPU 21a any more. Accordingly, the injection of fuel to the engine may be maintained by executing the interrupt control program in accordance with the flowchart in FIG. 6 in the engine cranking state.

It is to be noted that when there is no pulse signal from the pulse sensor 33 after the determination of YES in Step 205, a situation that the injection enabling mode is effected based on the post-starting injection enabling data D76 within the B/U RAM 34, even though the starter 40 is inhibited from activating, is prevented by inhibiting the shift from Step 209 to Step 210.

After that, when the number of revolutions Ne increases more than 500 rpm (see time t3 in FIG. 8D), it is determined to be YES in Step 204 in FIG. 3 and the same process as described before is carried out in Step 210.

In other words, that the number of revolutions Ne exceeds 500 rpm means that the start of the engine has been completed before the timer value of the timer 32b reaches two seconds.

Because the starter 40 has stopped already at this stage, +B voltage will not drop due to the activation of the starter 40 before the starting of the engine as described before.

Instead of that, an instant cut-off of +B voltage may be caused due to an improper connection between the CPU 32a and the battery Ba for example after starting the engine. Then, even when only the CPU 32a is reset again without resetting the CPU 21a due to such instant cut-off of the +B voltage, the engine ECU 30 can hold the injection enabling mode given initially by the security ECU 20 even if no injection enabling signal is transmitted again from the CPU 21a by the above-mentioned process in Step 210 carried out upon the determination of YES in Step 204.

Figure 6:
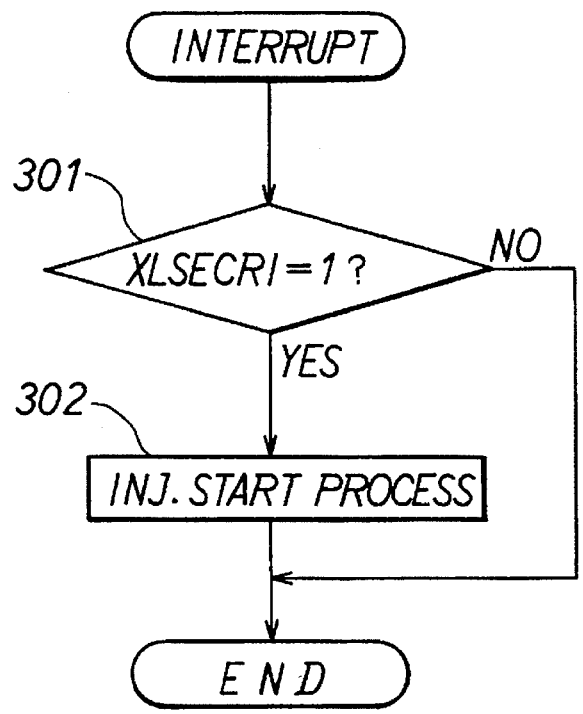
FIG. 6 shows a flowchart of an interrupt control program executed by the CPU of the engine ECU in FIG. 1.

As a result, the engine operative state after completing the starting may be held by maintaining the injection of fuel to the engine by executing the interrupt control program in accordance with the flowchart in FIG. 6.

2) Processing mode after when timer value of timer 32b has reached two seconds:

After when the timer value of the timer 32b has reached two seconds, i.e. when two seconds has passed since when the CPU 32a was initially reset, it is determined to be NO in Step 202 of the flowchart in FIG. 3. Succeedingly, it is determined to be YES in Step 211 if there is an injection enabling signal to be transmitted from the CPU 21a to the engine ECU 30 during the two seconds after the initial reset of the CPU 32a.

After that, when it is determined to be YES in Step 212 in FIG. 4 based on the timer value of the timer 32b, it is determined whether the number of revolutions Ne is more than 500 rpm or not.

When the number of revolutions Ne is more than 500 rpm, it is determined to be YES in Step 213 and it is determined in Step 214 whether the pre-starting injection enabling data D5C has been written in the B/U RAM 34 or not. Because the pre-starting injection enabling data D5C has been already written in the B/U RAM 34 at this stage as described before (see Step 210), it is determined to be YES in Step 214.

Then in Step 215, the data to be written into the B/U RAM 34 is rewritten into the post-starting injection enabling data D76. It prevents an occurrence of a situation that the injection enabling mode is maintained by the process of each Step 205, 209 and 210 even when no injection enabling signal is transmitted again from the security ECU 20 when the ignition switch 10b is turned on again after it has been turned off when the data written into the B/U RAM 34 remains to be the pre-starting injection enabling data D5C.

The post-starting injection enabling data D76 represents one byte of predetermined value (01110110) as shown in FIG. 7 and is different as compared with the pre-starting injection enabling data D5C at each bit of the second, fourth and sixth digits. That is, a difference of three bits is provided between the pre-starting injection enabling data D5C and the post-starting injection enabling data D76.

Figure 5:
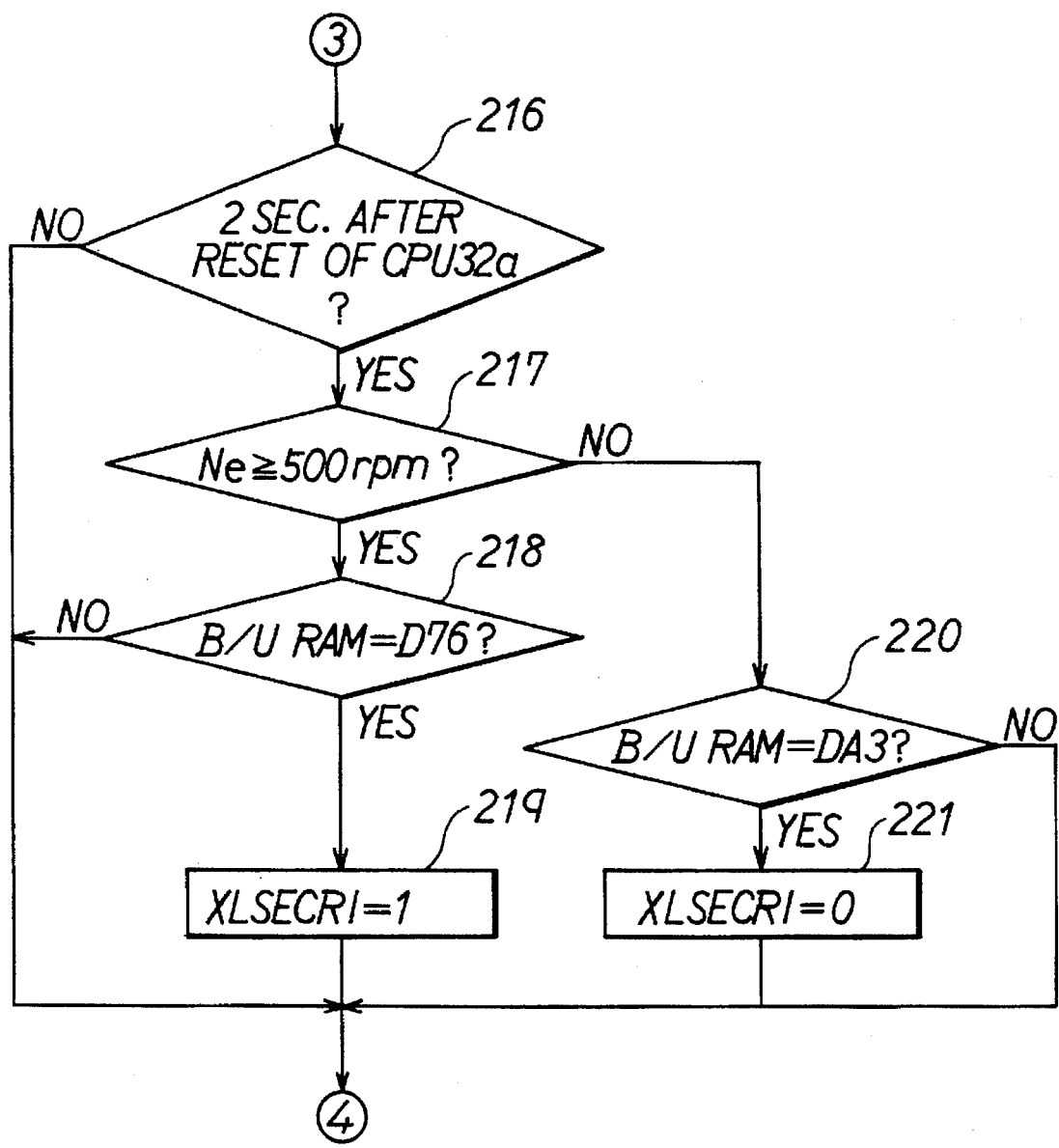
FIG. 5 shows a further part of the flowchart of the engine control program executed by the CPU of the engine ECU in FIG. 1.

It is to be noted that the engine control program is executed shifting from Step 215 to the flowchart in FIG. 5. The same applies to the case when it is determined to be NO in any one of each Step 212, 213 and 214.

When the timer value of the timer 32b has reached two seconds and it is determined to be YES in Step 216 in FIG. 5, it is determined in Step 217 whether the number of revolutions Ne is more than 500 rpm or not. When the number of revolutions Ne is more than 500 rpm, it is determined to be YES in Step 217 and it is determined in Step 218 whether the data written into the B/U RAM 34 is the post-starting injection enabling data D76 or not.

Because the data written into the B/U RAM 34 is the post-starting injection enabling data D76 at this stage (see Step 215), it is determined to be YES in Step 218 and the injection enabling flag is set again as XLSECRI=1 in Step 219.

Thereby, the engine ECU 30 can maintain the fuel injection enabling mode given by the security ECU 20 even if +B voltage is instantly cut off after when the timer value has reached two second after starting the engine.

When the number of revolutions Ne is not more than 500 rpm on the other hand, it is determined to be NO in Step 217 and it is determined in Step 220 whether the data written into the B/U RAM 34 is the injection inhibiting data DA3 or not. Because the injection inhibiting data DA3 is not written into the B/U RAM 34 at this stage, it is determined to be NO in Step 220.

The injection inhibiting data DA3 represents one byte of predetermined value (10100011) as shown in FIG. 7. The injection inhibiting data DA3 is different from the post-starting injection enabling data D76 respectively at the first, third, fifth, seventh and eighth digits. Due to that, the injection inhibiting data DA3 has a difference of 5 bits from the post-starting injection enabling data D76.

Further, because the post-starting injection enabling data D76 has a difference of 3 bits from the pre-starting injection enabling data D5C as described before, a difference of 8 bits is given between the injection inhibiting data DA3 and the pre-starting injection enabling data D5C.

Accordingly, because of the bit difference between the post-starting injection enabling data D76 and the injection inhibiting data DA3, the post-starting injection enabling data D76 is not transformed to the injection inhibiting data DA3 due to bit transformation caused by noise produced when the engine rotates at high-speed, for example, thereby inhibiting the injection of fuel to the engine.

Further, even if the post-starting injection enabling data D76 is transformed into the injection inhibiting data DA3 due to the bit transformation, the data written into the B/U RAM 34 is corrected as the post-starting injection enabling data D76 by setting again as XLSECRI=1 in Step 219 as described above.

Thereby, it allows to prevent the situation that the injection of the fuel to the engine is inhibited as described above from occurring more reliably. As a result, the injection of fuel to the engine is insured in the interrupt process in FIG. 6 thereafter.

3) Although the engine ECU 30 is allowed to maintain the injection enabling mode when +B voltage drops due to the activation of the starter 40 or when it drops due to the instant cut-off of +B voltage after the start of the engine in the processing mode of the engine ECU 30 in the injection enabling mode described above, the injection enabling mode may be insured based on the pre-starting injection enabling data D5C or post-starting injection enabling data D76 within the B/U RAM 34 even when the CPU 32a is returned to the normal condition after when it has been reset due to an abnormal operation such as an overrun thereof.

[3] Processing Mode by Engine ECU 30 in Injection Inhibiting Mode

1) Processing mode until timer value of timer 32b reaches two seconds:

When the engine control program reaches Step 206 of the flowchart in FIG. 3, it is determined whether the injection enabling signal from the security ECU 20 exists or not similarly to the case described above. If the injection inhibiting signal is transmitted from the security ECU 20 at this time, it is determined to be NO in Step 206 and then determined to be YES in Step 207.

Then, the injection inhibiting data DA3 is written into the B/U RAM 34 and the injection enabling flag is reset as XLSECRI=0 in Step 208. Thereby, the engine ECU 30 can maintain the injection inhibiting mode given from the security ECU 20 even no injection inhibiting signal is transmitted again from the CPU 21a when only the CPU 32a is reset again without resetting the CPU 21a as +B voltage drops due to its instant cut-off. Accordingly, even if the starter switch 10c is illegitimately turned on, the engine will not start.

2) Processing mode after when timer value of timer 32b reached two seconds:

When it is determined to be NO in Step 202 of the flowchart in FIG. 3 similarly to the case described above, it is determined to be YES in Step 211 if there is the injection inhibiting signal transmitted from the CPU 21a to the engine ECU 30 during two seconds since the initial reset of the CPU 32a.

Next, when it is determined to be YES in Step 212 in FIG. 4 similarly to the case of Step 202, it is determined to be NO in Step 213 because no pulse signal is generated from the pulse sensor 33.

After that, it is determined to NO also in Step 217 in FIG. 5 for the same reason. Then, it is determined in Step 220 whether data written into the B/U RAM 34 is the injection inhibiting data DA3 or not.

Because the injection inhibiting data DA3 has been written into the B/U RAM 34 at this stage (see Step 208), it is determined to be YES in Step 220 and the injection enabling flag is reset again as XLSECRI=0 in Step 221.

Thereby, the engine ECU 30 can maintain the fuel injection inhibiting mode given by the security ECU 20 even if +B voltage is instantly cut off after when the timer value of the timer 32b has reached two seconds after starting the engine.

In such case, because the bit difference as described before is given between the injection inhibiting data DA3 and the pre-starting injection enabling data D5C or the post-starting injection enabling data D76, the injection inhibiting data DA3 is not transformed to the pre-starting injection enabling data D5C or the post-starting injection enabling data D76 due to the bit transformation caused by noise or the like.

Further, even if the injection inhibiting data DA3 is transformed to the pre-starting injection enabling data D5C or the post-starting injection enabling data D76 due to the bit transformation, the data written into the B/U RAM 34 is corrected as the injection inhibiting data DA3 by resetting again as XLSECRI=0 in Step 221 as described above. Due to that, a situation that the injection of fuel to the engine is erroneously permitted is more reliably prevented from occurring.

It is to be noted that when there is no signal from the CPU 21a during two seconds after when the CPU 32a has been initially reset, it is determined to be NO in Step 211 and the process in Step 208 is carried out in the same manner as described above.

In the first embodiment, the post-starting injection enabling data D76, not the pre-starting injection enabling data D5C, is stored in the B/U RAM 34 after when the vehicle has been stopped by normally stopping the engine. Due to that, it is determined to be NO in Step 205 (see FIG. 3) based on the post-starting injection enabling data D76 even if +B voltage of the battery Ba is illegitimately supplied to the engine ECU 30 and the starter 40 during when the vehicle is stopped. Accordingly, the injection of fuel is not enabled, preventing the vehicle from being stolen.

In other words, the following problem may be prevented from occurring. That is, when the injection enabling signal is transmitted from the security ECU 20 to the engine ECU 30 without rewriting the data written into the B/U RAM 34 from the pre-starting injection enabling data D5C to the post-starting injection enabling data D76, the pre-starting injection enabling data D5C remains to be the data written into the B/U RAM 34 unless it is determined that the password codes do not coincide, if it is determined to be normal once. Accordingly, the data written into the B/U RAM 34 is still the pre-starting injection enabling data D5C during when the vehicle is parked after the vehicle has been driven by the legitimate owner.

Due to that, when +B voltage of the battery Ba is supplied illegitimately (e.g. by short-circuiting the battery Ba and a terminal of the ignition switch 10b on the side of security ECU 20) to the engine ECU 30 and the starter 40 in such state, the engine ECU 30 starts the engine regardless of the result of the collation of the password codes because the data written into the B/U RAM 34 is still the pre-starting injection enabling data D5C. However, according to the first embodiment, such problem may be reliably prevented from occurring by rewriting the data written into the B/U RAM 34 from the pre-starting injection enabling data D5C to the post-starting injection enabling data D76 as described above.

Further, according to the first embodiment, a criterion of the number of revolutions Ne in Step 204 is set to be more than 500 rpm as described above. Due to that, when the number of revolutions Ne exceeds the number of revolutions for completing the engine start, the data written into the B/U RAM 34 is rewritten from the pre-starting injection enabling data D5C to the post-starting injection enabling data D76. Accordingly, it allows to normally start the engine and to prevent the engine from being started by illegitimate manipulation even when +B voltage of the battery Ba drops as the starter is activated and the CPU 32a is reset.

In other words, it allows to prevent the following problem from occurring. That is, if the criterion of the number of revolutions Ne in Step 204 is more than 2000 rpm and when the legitimate owner of the vehicle has started the engine and stops it before the number of revolutions Ne exceeds 2000 rpm, the data written into the B/U RAM 34 remains to be the pre-starting injection enabling data D5C.

Due to that, when +B voltage of the battery Ba is illegitimately supplied to the engine ECU 30 and the starter 40 in such state, the engine is illegitimately started after determining to be YES in Step 205. However, according to the first embodiment, such problem may be reliably prevented by setting the criterion of the number of revolutions Ne in Step 204 as more than 500 rpm as described above.

Meanwhile, if the criterion of the number of revolutions Ne in Step 204 is set to be more than 300 rpm (a number of revolutions lower than the number of revolutions for completing the engine start), although the engine will not be illegitimately started, the data written into the B/U RAM 34 is rewritten from the pre-starting injection enabling data D5C to the post-starting injection enabling data D76 before completing to start the engine.

Due to that, when the CPU 32a is reset when the starter is activated and the +B voltage of the battery Ba drops, the engine is disabled to start. However, according to the first embodiment, such problem may be reliably prevented by setting the criterion of the number of revolutions Ne in Step 204 to be more than 500 rpm.

[Second Embodiment]

A second preferred embodiment of the present invention will be explained with reference to FIGS. 9 through 13.

In the second embodiment, an engine ECU 30A is adopted instead of the engine ECU 30 described in the first embodiment and a main relay 60 is adopted additionally. The second embodiment is characterized mainly in that the pre-starting injection enabling data D5C is changed to the post-starting injection enabling data D76 by determining the manipulation state of the ignition switch 10b, not changing the pre-starting injection enabling data D5C to the post-starting injection enabling data D76 by determining that the start of the engine is completed like the first embodiment described above.

The engine ECU 30A has a structure in which a transistor 37 and two diodes 38 and 39 are added in the engine ECU 30 described above. The transistor 37 is connected, with its collector, to a positive side terminal of the battery Ba via an exciting coil 61 of the main relay 60. A base of the transistor 37 is connected to each cathode of the diodes 38 and 39.

The diode 38 selectively conducts by being controlled by the CPU 32a at its anode and the diode 39 conducts by receiving +B voltage from the positive side terminal of the battery Ba via the ignition switch 10b at its anode. Thereby, the transistor 38 is put into ON state when either the diode 38 or 39 conducts.

Figure 10:
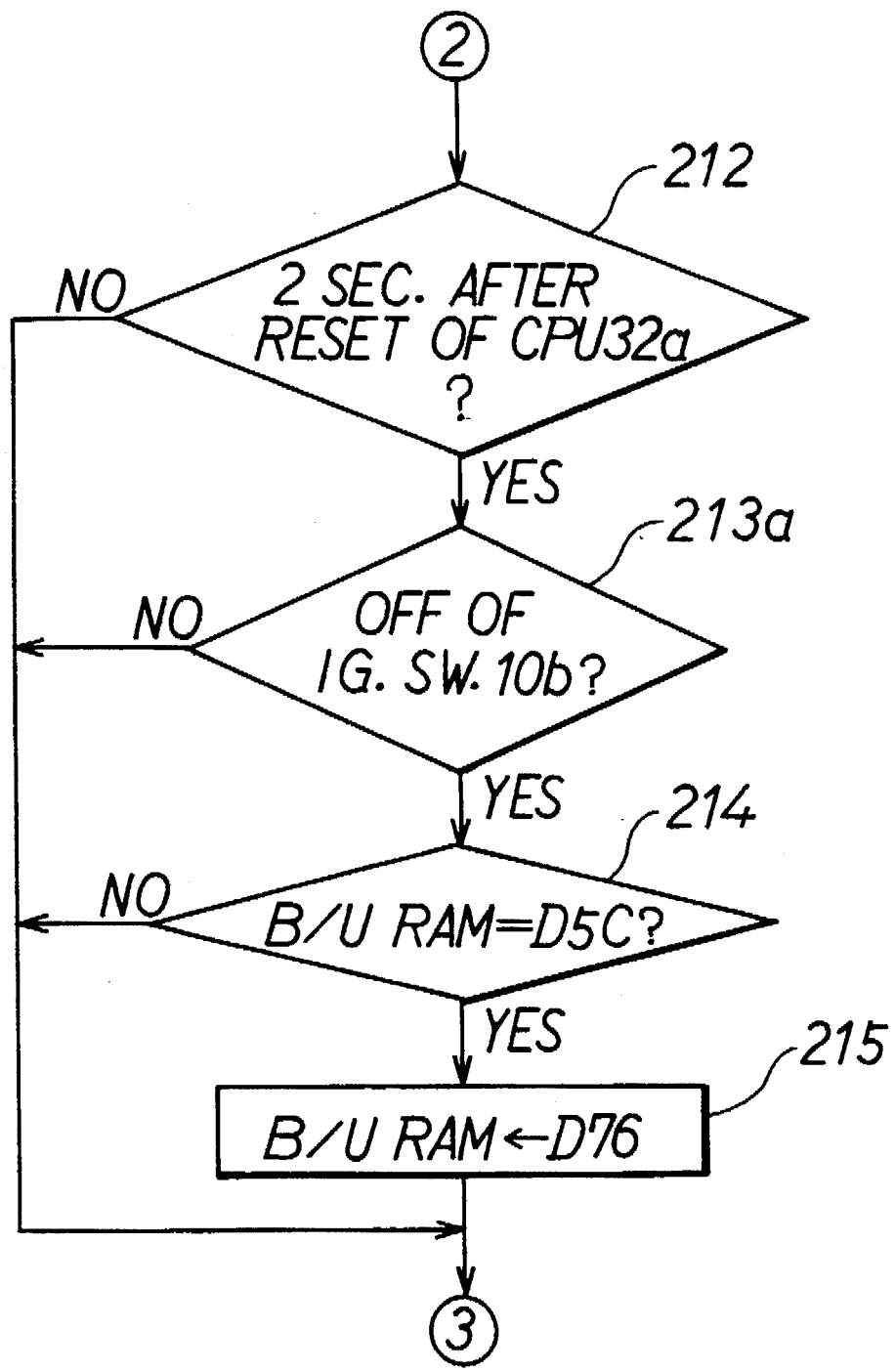
FIG. 10 is a flowchart showing a part of an engine control program executed by a CPU of an engine ECU in the second embodiment.
Figure 11:
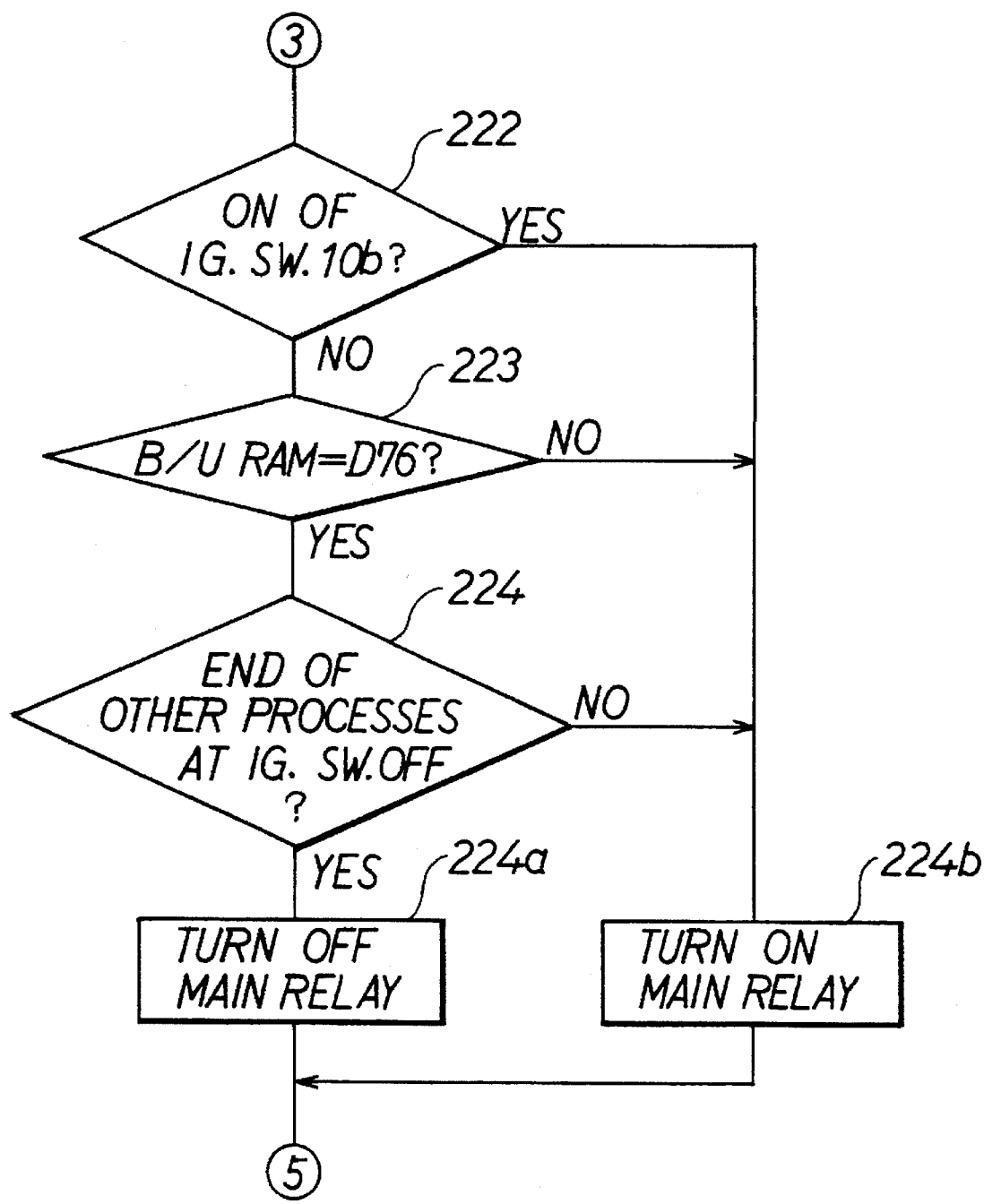
FIG. 11 is a flowchart showing another part of the engine control program executed by the CPU of the engine ECU in the second embodiment.
Figure 12:
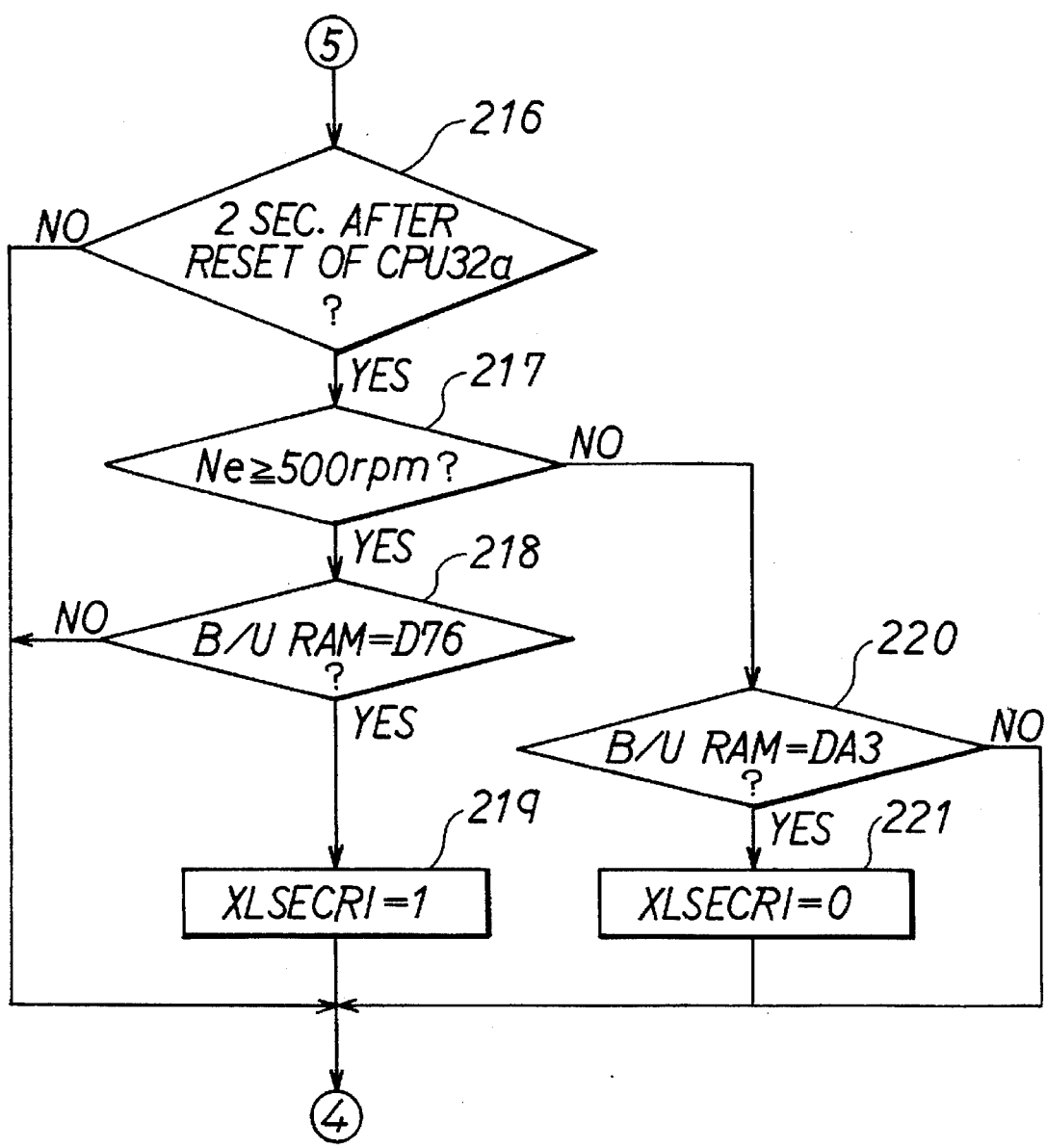
FIG. 12 is a flowchart showing a further part of the engine control program executed by the CPU of the engine ECU in the second embodiment.

Further, in the engine control program stored in the ROM of the CPU 32a, the flowchart shown in FIG. 4 is changed to a flowchart shown in FIG. 10 and the flowchart in FIG. 5 is changed as shown in FIGS. 11 and 12.

The main relay 60 has the exciting coil 61 and a normally-opened relay switch 62. The relay switch 62 is connected between the positive side terminal of the battery Ba and the voltage stabilizing circuit 36. Thus, the exciting coil 61 is excited by receiving +B voltage from the battery Ba when the transistor 37 is turned on. The exciting coil 61 demagnetizes when the transistor 37 is turned off. The relay switch 62 closes when the exciting coil 61 is excited and applies +B voltage from the battery Ba to the voltage stabilizing circuit 36. The structure other than that is the same as in the first embodiment described above.

In the second embodiment constructed as described above, when the ignition switch 10b is turned on, the diode 39 also conducts by normally receiving +B voltage from the battery Ba via the ignition switch 10b and turns on the transistor 37.

Thereby, the main relay 60 closes the relay switch 62 as the exciting coil 61 is normally excited, the voltage stabilizing circuit 36 generates a constant-voltage and the CPU 32a is reset by this constant-voltage, executing the engine control program in accordance with each flowchart shown in FIGS. 3, 10, 11 and 12.

Then, in the processing mode until when the timer value of the timer 32b reaches two seconds, it is determined to be YES in Step 222 (see FIG. 11) determining that the ignition switch 10b is turned on based on +B voltage from the battery Ba via the ignition switch 10b after performing the processing in Step 210 (see FIG. 3) as described in the first embodiment.

Then, a process for turning on the main relay 60 is performed in Step 224b. That is, the CPU 32a turns its output port to high-level to cause the diode 38 to conduct. Thereby, the transistor 37 is kept ON and the exciting coil 61 of the main relay 60 is kept in the excited state. Due to that, the main relay 60 is put into a self-holding state and keeps to supply +B voltage to the voltage stabilizing circuit 36 regardless if the ignition switch 10b is turned off or not.

Accordingly, because the pre-starting injection enabling data D5C has been written into the B/U RAM 34 at the present stage (see Step 210), it is determined to be NO in both Steps 222 and 223 (see FIG. 11) even if the ignition switch 10b is turned off and the main relay 60 keeps the self-holding state by the process in Step 224b. It is to be noted that it is determined to be NO in Step 216 thereafter (see FIG. 12).

Next, when it is determined to be YES in Step 212 (see FIG. 10) similarly to the first embodiment along the elapse of more than two seconds after the reset of the CPU 32a, it is determined in Step 213a whether the ignition switch 10b is turned off or not.

When the ignition switch 10b is turned off, it is determined to be YES in Step 213a, the data written into the B/U RAM 34 is rewritten from the pre-starting injection enabling data D5C to the post-starting injection enabling data D76 similarly to the first embodiment in Step 215 after determining to be YES in Step 214 (see time t4 in FIGS. 13A to 13F).

The same effect of rewriting the data written into the B/U RAM 34 from the pre-starting injection enabling data D5C to the post-starting injection enabling data D76 when the number of revolutions Ne=500 rpm described in the first embodiment may be assured by rewriting the data written into the B/U RAM 34 from the pre-starting injection enabling data D5C to the post-starting injection enabling data D76 when the ignition switch 10b is turned off during when the main relay 60 is ON.

Further, the second embodiment allows not only to select a timing for switching the data to be written into the B/U RAM 34 regardless of the number of revolutions Ne=500 rpm as a matter of course, but also to rewrite the data written into the B/U RAM 34 from the pre-starting injection enabling data D5C to the post-starting injection enabling data D76 even with a type of engine whose number of revolutions for completing its starting is different from 500 rpm.

Then, it is determined to be YES in Step 223 based on the post-starting injection enabling data D76 within the B/U RAM 34 and it is determined to be YES in Step 224 when other processing performed during when the ignition switch 10b is turned off has been finished. After that, a process for turning off the main relay 60 is performed in Step 224a.

That is, the output port of the CPU 32a turns to low-level, the diode 38 becomes non-conductive, the transistor 37 is turned off and the main relay 60 opens the relay switch 62 as the exciting coil 61 is demagnetized (see time t5 in FIG. 13). Due to that, the voltage stabilizing circuit 36 stops to generate a constant-voltage.

Thereby, the CPU 32a of the engine ECU 30A stops its operation. As a result, the fuel injector 50 is inhibited from injecting fuel. Then, the vehicle stops.

In this case, the data written into the B/U RAM 34 is rewritten from the pre-starting injection enabling data D5C to the post-starting injection enabling data D76 when the ignition switch 10b is turned off in stopping the vehicle as described above.

Accordingly, even if +B voltage is supplied from the battery Ba to the engine ECU 30, the engine is not started because the data written into the B/U RAM 34 is the post-starting injection enabling data D76.

It is to be noted that the data written into the B/U RAM 34 has been the post-starting injection enabling data D76 in the second embodiment, the data written into the B/U RAM 34 may be rewritten into the pre-starting injection enabling data D5C or data other than the post-starting injection enabling data D76.

The present invention is not confined only to respective embodiments described above. Rather, it may be realized by various variations as follows.

Although the case when the engine of the vehicle is a motor has been explained in each embodiment described above, the present invention may be applied and practiced even for an electric motor of an electric car, an engine of a motor-cycle and a boat whose driving source is a motor.

Although the case in which the present invention is applied to the fuel injection system and starter of the engine has been explained in each embodiment described above, the present invention may be applied and practiced not only to an engine ignition system, but also to the fuel injection system and the starter as well as the ignition system.

Although the case when the security ECU 20 has the CPU 21a has been explained in each embodiment described above, the present invention is not confined only to that and is applicable also to a case when the security ECU 20 does not have the CPU 21a.

Although the case wherein the engine is started by manipulating the ignition switch 10b and the starter switch 10c has been explained in each embodiment described above, the present invention is not confined only to that and is arranged so that the engine is started by a keyless entry system.

In each embodiment described above, the B/U RAM 34 may be a memory capable of backing up such as a DRAM or be a non-volatile memory.

Although the case when the engine start completing number of revolutions is 500 rpm has been explained in each embodiment described above, the present invention is not confined to that and it may be practiced by changing the start completing number of revolutions as necessary.

The present invention may be practiced by changing each value of the pre-starting injection enabling data D5C, the post-starting injection enabling data D76 and the injection inhibiting data DA3 described above in each embodiment adequately in a range in which either one value is not transformed to another value from each other by bit transformation.

Each step in each flowchart of each embodiment described above may be realized by a hard logic structure, respectively, as function executing means.

Although the case when the completion of engine start is determined by the number of revolutions Ne has been explained in each embodiment described above, the present invention may be practiced to determine the completion of engine start by a total number of times of ignition of the engine when the starter is off for example.

Further, in the first and second embodiments, the content stored in the storage means of the engine control ECU for preventing engine starting by an unauthorized person. That is, it is changed when the engine speed has reached 500 rpm after the turn on of the key switch in the first embodiment and when the key switch turns off in the second embodiment. The storage content changing timing may be modified to such timing as when the starter once driven is stopped, the engine speed reaches the idling speed, when a predermined time lapses after the turning on of the ignition switch, when the engine speed falls to zero after stopping the vehicle, or when the main relay turns off after the turning off of the key switch. Thus, the timing to change the stored content in the memory stored at the time of engine starting operation may be made until the time the voltage supply from the power souce to the engine control unit is stopped.

What is claimed is:

1. A vehicular anti-theft system comprising:

a security unit for transmitting engine start enabling data when a vehicular engine is operated to start;

an engine control unit equipped with a CPU reset by a voltage supplied from a power source (Ba) at a time of starting operation and performing arithmetic operations for starting said engine based on said start enabling data; and storage means for storing said start enabling data as start enabling information;

wherein said CPU performs arithmetic operations so as to maintain the starting of said engine and the operation thereafter based on said information stored in said storage means even if said CPU is reset again after the transmission of said start enabling data.

2. A vehicular anti-theft system comprising:

security unit for transmitting engine start enabling data when said engine is normally started and engine start inhibiting data when said engine is illegitimately started;

an engine control unit equipped with a CPU reset by a voltage supplied from a power source at a time of said starting and performing arithmetic operations for starting said engine based on said start enabling data, said CPU being reset by said illegitimate starting operation and performing arithmetic operations for inhibiting to start said engine based on said start inhibiting data; and storage means for storing said start enabling data and start inhibiting data as start enabling information and start inhibiting information, respectively, wherein said CPU performs arithmetic operations so as to maintain the starting of said engine, the operation thereafter and the inhibition of starting based on the information stored in said storage means even if said CPU is reset again after the transmission of said start enabling data and start inhibiting data.

3. The vehicular anti-theft system of claim 2 further comprising:

engine speed detecting means for detecting a number of revolutions of said engine, wherein said CPU performs arithmetic operations so as to maintain the starting of said engine based on said stored start enabling information even if said CPU is reset again when said storage means stores said start enabling information before said detected number of revolutions reaches a start completing number of revolutions of said engine.

4. The vehicular anti-theft system of claim 3, wherein said CPU performs arithmetic operations so as to maintain the operation of said engine even if said CPU is reset again after said detected number of revolutions reaches the start completing number of revolutions of said engine.

5. The vehicular anti-theft system of claim 2 further comprising:

engine speed detecting means for detecting a number of revolutions of said engine, wherein said CPU maintains the starting of said engine based on said start enabling information of pre-starting start enabling data even if said CPU is reset again when said storage means stores said pre-starting start enabling data as said start enabling information before said detected number of revolutions reaches a start completing number of revolutions of said engine, wherein said storage means stores post-starting start enabling data of said engine as start enabling information instead of said pre-starting start enabling data after when said detected number of revolutions has reached the start completing number of revolutions of said engine, and said CPU performs arithmetic operations so as to maintain the operation of said engine even if said CPU is reset again based on said start enabling information of said stored post-starting start enabling data.

6. The vehicular anti-theft system of claim 5, wherein said pre-starting start enabling data, said post-starting said start enabling data and start inhibiting data are composed respectively of a value of predetermined digits and at least a part of two digits of said start inhibiting data is different from that of said pre-starting start enabling data and said post-starting start enabling data.

7. The vehicular anti-theft system of claim 6, wherein each value of predetermined digits of said pre-starting start enabling data, said post-starting start enabling data and said start inhibiting data are composed respectively of a value of eight bits and said start inhibiting data has a difference of three bits from said post-starting start enabling data and has a difference of eight bits from said pre-starting start enabling data.

8. The vehicular anti-theft system of claim 2, wherein said storage means is a non-volatile memory.

9. The vehicular anti-theft system of claim 8 further comprising:

engine speed detecting means for detecting a number of revolutions of said engine, wherein said CPU maintains the starting of said engine based on the start enabling information of pre-starting start enabling data even if said CPU is reset again when said storage means stores said pre-starting start enabling data as said start enabling information before said detected number of revolutions reaches a start completing number of revolutions of said engine, wherein said storage means stores post-starting start enabling data of said engine as said start enabling information instead of said pre-starting start enabling data after when said detected number of revolutions has reached said start completing number of revolutions of said engine, and wherein said CPU performs arithmetic operations so as to maintain the operation of said engine even if said CPU is reset again based on said start enabling information of said stored post-starting start enabling data.

10. The vehicular anti-theft system of claim 1, wherein said information stored in said storage means at the time of starting said engine is changed to another information to be stored in said storage means during a time before the supply of voltage from said power source to said engine control unit to stop the operation of said engine.

11. A vehicular anti-theft system comprising:

a security unit for transmitting engine start enabling data when a starting switch of a vehicular engine is manipulated;

an engine control unit having a CPU reset by a voltage supplied from a power source at a time of manipulation of said starting switch and performing arithmetic operations to start said engine based on said start enabling data;

relay means driven at a time of manipulation of said starting switch and permitting to supply a voltage from said power source to said CPU, said relay means supplying a voltage of said power source to said CPU for a predetermined period of time after when said starting switch is released; and storage means for storing said start enabling data as start enabling information, wherein said CPU performs arithmetic operations so as to maintain starting of said engine and the operation thereafter even if said CPU is reset again after said start enabling data is transmitted based on the information stored in said storage means, and wherein other information is stored instead of said start enabling information during when said relay means supplies a voltage of said power source to said CPU for a predetermined period of time after when said starting switch has been released.

12. The vehicular anti-theft system of claim 1 further comprising:

engine speed detecting means for detecting a number of revolutions of said engine, wherein said CPU performs arithmetic operations so as to maintain the starting of said engine based on said stored start enabling information even if said CPU is reset again when said storage means stores said start enabling information before said detected number of revolutions reaches a start completing number of revolutions of said engine.

13. The vehicular anti-theft system of claim 12, wherein said CPU performs arithmetic operations so as to maintain the operation of said engine even if said CPU is reset again after said detected number of revolutions reaches the start completing number of revolutions of said engine.

14. The vehicular anti-theft system of claim 1 further comprising:

engine speed detecting means for detecting a number of revolutions of said engine, wherein said CPU maintains the starting of said engine based on said start enabling information of pre-starting start enabling data even if said CPU is reset again when said storage means stores said pre-starting start enabling data as said start enabling information before said detected number of revolutions reaches a start completing number of revolutions of said engine, wherein said storage means stores post-starting start enabling data of said engine as said start enabling information instead of said pre-starting start enabling data after when said detected number of revolutions has reached the start completing number of revolutions of said engine, and said CPU performs arithmetic operations so as to maintain the operation of said engine even if said CPU is reset again based on said start enabling information of said stored post-starting start enabling data.

15. The vehicular anti-theft system of claim 14, wherein said pre-starting start enabling data, said post-starting start enabling data and start inhibiting data indicative of illegitimate starting are composed respectively of a value of predetermined digits and at least a part of two digits of said start inhibiting data is different from that of said pre-starting start enabling data and said post-starting start enabling data.

16. The vehicular anti-theft system of claim 15, wherein each value of predetermined digits of said pre-starting start enabling data, said post-starting start enabling data and said start inhibiting data are composed respectively of a value of eight bits and said start inhibiting data has a difference of three bits from said post-starting start enabling data and has a difference of eight bits from said pre-starting enabling data.

17. The vehicular anti-theft system of claim 1, wherein said storage means is a non-volatile memory.

* * * * *